(12) United States Patent
Vanderheiden (10) Patent No.: US 6,384,743 B1
(45) Date of Patent: May 7, 2002

(54) TOUCH SCREEN FOR THE VISION-IMPAIRED

(75) Inventor: Gregg C. Vanderheiden, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/332,676

(22) Filed: Jun. 14, 1999

(51) Int. Cl.[7] .............................................. H03K 17/94
(52) U.S. Cl. ................. 341/21; 340/407.1; 340/825.19; 345/173; 434/112
(58) Field of Search ......................... 341/21; 340/407.1, 340/407.2, 825.19; 345/173; 434/112, 113

(56) References Cited

U.S. PATENT DOCUMENTS

| | | | |
|---|---|---|---|
| 4,868,912 A | 9/1989 | Doering | 340/706 |
| 4,884,972 A | 12/1989 | Gasper | 434/185 |
| 4,914,624 A | 4/1990 | Dunthorn | 364/900 |
| 5,023,922 A | 6/1991 | Abramovitz et al. | 382/59 |
| 5,186,629 A * | 2/1993 | Rohen | 434/112 |
| 5,287,102 A | 2/1994 | McKiel, Jr. | 340/825.19 |
| 5,374,924 A | 12/1994 | McKiel, Jr. | 340/825.19 |
| 5,424,756 A | 6/1995 | Ho et al. | 345/158 |
| 5,461,399 A | 10/1995 | Cragun | 345/145 |
| 5,589,855 A * | 12/1996 | Blumstein et al. | 345/173 |
| 6,031,531 A * | 2/2000 | Kimble | 340/825.19 |
| 6,049,328 A * | 4/2000 | Vanderheiden | 345/173 |
| 6,140,913 A * | 10/2000 | Okada et al. | 340/407.2 |

* cited by examiner

Primary Examiner—Timothy Edwards
(74) Attorney, Agent, or Firm—Quarles & Brady LLP (57) ABSTRACT

A touch screen system for the vision-impaired provides a speed list in which each of the virtual buttons on a screen are duplicated in a line along one edge of the screen to provide rapid access to the virtual buttons while taking advantage of their logical grouping among multiple screens to assist both vision-impaired and fill-sighted individuals.

11 Claims, 3 Drawing Sheets

TOUCH SCREEN FOR THE VISION-IMPAIRED

This invention was made at the Trace R&D Center of the University of Wisconsin Madison with United States Government support awarded by DED Grant #H133E30012

The United States has certain rights in this invention.

FIELD OF THE INVENTION

The invention relates generally to computer systems using touch screens, and in particular, to a touch screen system suitable for use by the vision-impaired.

BACKGROUND OF THE INVENTION

An electronic touch screen provides an alternative to a standard typewriter-style electronic keyboard for the entry of data into a computer. With a touch screen system, the user enters data by touching virtual buttons displayed on the computer display. The touch screen eliminates the need for a separate keyboard, and the space required for the keyboard, and may offer a more intuitive interface to users unfamiliar with computer operation.

With a touch screen system, the type, size, and number of the virtual buttons may be readily changed by changing computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a CRT or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display or by systems using crossed beams of infrared light arrayed along x and y axes which are broken by the finger, or by laminated transparent electrodes which are physically compressed against each other to provide a point electrical contact that may be interpreted as an x and y coordinate.

Despite the advantages of touch screen systems in certain applications, they present an insurmountable barrier to the vision-impaired user who perceives only the featureless surface of the display screen knowing that it may contain one or more virtual buttons of arbitrary placement and function.

In contrast, a typewriter-style electronic keyboard, with its tactilely distinguishable keys and standard layout, can be used by both full-sighted and vision-impaired individuals.

It would be desirable to find a method of making touch screen systems accessible to both full-sighted and vision-impaired individuals, that preserves some of the advantageous aspects of a touch screen system in simplifying data entry tasks and in providing a flexible user interface. It would also be desirable to make such systems usable by those who can see but who cannot effectively read the text which is displayed and which is necessary for system use.

SUMMARY OF THE INVENTION

The present invention provides a touch screen usable by both full-sighted and vision-impaired individuals. In the invention, the spatial extent and location of the touch screen's buttons are indicated by a distinctive sound ("audio ridge") triggered when a user's finger crosses into or out of the button boundaries separate from a spoken message which identifies the function of the button. A background sound identifies points on the screen which are outside any virtual button.

The possibility of confusing, multiple audio ridge signals, such as might be created by a touch position neither clearly in nor out of the virtual button, are eliminated by defining separate button boundaries for entry and exit of the button with the exit boundaries being somewhat larger. Intelligibility of the spoken message identifying the function of the virtual button is ensured by providing two modes of operation upon leaving a virtual button. If upon leaving the button the screen is still contacted, the spoken message is truncated facilitating the ability to move between buttons without the need to fully play each button's spoken message. If the touch point is removed, i.e., the finger is lifted from the screen, the message continues to play to alert the user of any new button that may have been entered even instantaneously before lifting the finger.

The arbitrary spatial arrangement of the buttons may be compressed into a linear format termed a "speed list" that works in conjunction with the normal virtual buttons of the touch screen but enables the user to move quickly between the various buttons. The speed list may be aligned with a guide ridge at the edge of the screen, the guide ridge including tactile separators to further aid the user in moving between these buttons.

Specifically, the touch screen of the present invention provides an electronic display screen having a display area positioned beneath a touch panel commensurate with the display area and providing a coordinate output indicating a touch point in the display area. The electronic display screen, the touch panel and audio circuitry are connected to an electronic computer which executes a stored program to identify a boundary of a virtual button with respect to the display screen and when the touch point crosses the boundary, to instruct the audio circuitry to generate an audio ridge signal delineating the boundary. The electronic computer then instructs the audio circuitry to generate a spoken message identifying the virtual button while the touch point is within the boundary.

A first audio ridge signal may be generated when the touch point crosses into the boundary of the virtual button and a second audio ridge signal may be generated when the touch point crosses out of the boundary. Further, the audio circuitry may generate a background sound while the touch point is outside the boundary.

Thus, it is one object of the invention to allow the user to scan the touch point across the screen and, through the use of audio ridge signals combined with a spoken message, obtain a mental map of button placement, size and function. The use of an audio ridge signal that is distinct from the spoken message separates the concepts of the button space and button function, improving the user's understanding of the screen.

The electronic computer may identify a first inner boundary and a second outer boundary of the virtual button, and the audio circuitry may be instructed to generate the audio ridge signal only when the touch point is crossing into the inner boundary or when the touch point is crossing out of the outer boundary.

Thus, it is another object of the invention to provide the benefits of a separate audio ridge signal without the risk of generating ambiguous tones if the boundary is only partially crossed. By moving the boundary point, depending on the direction of entry or exit from the virtual button, multiple accidental crossings of the boundary are eliminated, aiding in intelligibility.

The electronic computer may display plurality of first virtual buttons having arbitrary locations on the display screen and may activate one of the virtual buttons to execute an associated software routine when the touch point is at the location of the activated virtual button. The computer may also generate a plurality of second virtual buttons having a one-to-one correspondence with the first plurality virtual buttons, but arranged on the display screen in the linear array. When the touch point is within the location of one of the second virtual buttons, a subroutine associated with the one virtual button and with one of the first virtual buttons is activated.

The electronic screen may further include a frame extending around the display surface and providing a ridge along which a finger may be drawn and the plurality of second virtual buttons may be arranged on the display screen adjacent and parallel to the ridge. The ridge may also include a plurality of embossments, and the virtual buttons may be arranged on the display screen to align with one each of the plurality of embossments.

Thus, it is another object of the invention to provide a duplicate set of virtual buttons on the screen arrayed in a fashion to facilitate use by a vision-impaired individual. This second list, besides being in a straight line, may have standard spacing and a limited extent. Thus the user, by running his or her finger or stylus along this line, can determine all the possible buttons on that screen.

The electronic computer may generate a spoken message identifying a virtual button when the touch point crosses into the virtual button. When the touch point then crosses out of the virtual button the message may be truncated. However, if the touch point disappears off the screen the message will be completed.

Thus, it is yet another object of the invention to ensure that a complete message is communicated to the user when the user's finger is lifted from the touch screen, for example, prior to confirmation of button selection, and yet to allow the user to move quickly from message to message without the need to listen to the complete message. It will be understood that this feature, as well as others to be described, will be of benefit not only to the vision-impaired but also to those who have trouble reading the text messages for any reason including unfamiliarity with the written language.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
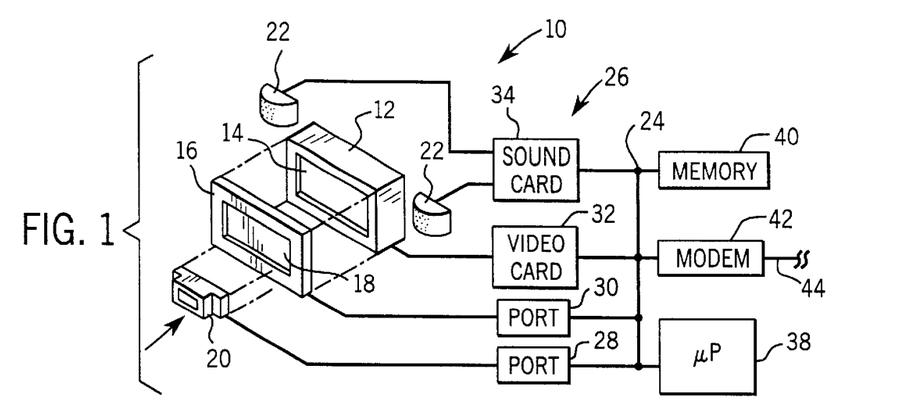
FIG. 1 is a simplified blocked diagram of a typical touch screen system such as may be used in a kiosk showing the position of the touch panel in front of a display screen with a separate confirmation button positioned at the bottom of the screen.

Referring now to FIG. 1, a touch screen system 10 includes an electronic display 12 having a generally planar and rectangular display area 14 on which text and graphics may be displayed. Such displays 12 are well known in the art and may make use of a cathode ray terminal ("CRT") or a liquid crystal display ("LCD").

Positioned in front of the display area 14 is a touch panel 16 having an active area 18 commensurate in size with the display area 14. The display area 14 may be seen through the active area 18, and a user touching the display area 14 with a finger or stylus (not shown) must pass the finger or stylus first through the active area 18. Touch panels 16 are also well known in the art and may employ a number of different technologies, including those employing crossed beams of infrared light (which detect the finger by the interruption of one or more beams), and those employing layered transparent electrodes (which detect the finger by its deforming the layers and causing the electrodes to touch).

Preferably, in the present invention, the touch panel 16 provides a high resolution X-Y coordinate signal indicating the position of the finger on the display area 14, and "no stylus signal" when the finger is removed. Thus, the location of a touch point of a finger against the display area 14 can be accurately assessed.

A confirmation button 20, being a single-pole single-throw momentary push button switch is mounted beneath the touch panel 16 in a prominent and uniform location to be accessible to a sight impaired individual.

Flanking the display 12 are one or more speakers 22 directed toward the user of the touch screen system 10 so that speech and tones generated by the speakers 22 may be heard by the user.

Each of the various components 12, 16, 20 and 22 are connected to an internal computer bus 24 by commercially available adapter cards 26. The confirmation button 20 is connected to the bus 24 by a standard mouse or keyboard port 28 whereas the signal from the touch screen is received by a serial port 30. A video card 32 provides the interface between the bus 24 and the display 12 and a sound card 34 provides an interface between the computer bus 24 and the speakers 22. The sound card 34 may include an on-board amplifier, to provide sufficient volume to the speakers 22, and may include a standard FM synthesizer chip as well as a digital-to-analog converter ("ADC") for synthesizing arbitrary wave forms from a stored sound look up table. This latter feature permits, for example, generating spoken words from text according to readily available speech synthesis software.

Also attached to the computer bus 24 is a microprocessor 38 and associated computer memory 40 for holding a stored program executed by the microprocessor 38 together with variables used in that stored program.

A modem 42 connects the computer bus 24 to a telephone line 44 to provide access to a remote computer, such as a central bank computer, if for example, the touch screen system 10 is used as a remote terminal in an automated teller machine ("ATM") or the like.

Figure 2:
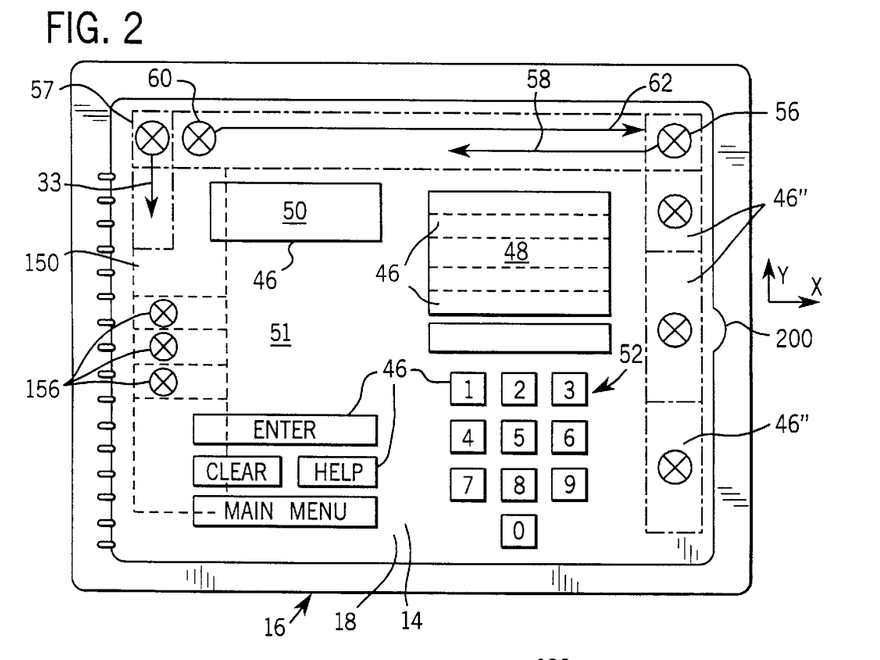
FIG. 2 is a front elevation view of the display screen of FIG. 1 showing an example set of virtual buttons together with particular touch points and trajectories associates with features of the invention.

Referring now to FIGS. 1 and 2, the processor 38 may display on the display area 14 a number of virtual buttons 46 arranged arbitrarily over the surface of the display area and divided into one or more "screens" displayed on at a time on the display area 14. The virtual buttons 46 are grouped on the display area 14, for example, by function, to improve their ease of use. The virtual buttons 46 are also grouped among different screens, for example, to divide the user's interaction the touch screen system 10 into discrete logical stages.

The virtual buttons 46, in their simplest embodiment, are rectangular images containing an alphanumeric label. These images are formed by the video card 32 receiving instructions from the microprocessor 38 which most typically simply relays an image previously stored in memory 40.

Virtual buttons 46 may be "pressed" by a user touching the display area 14 (as is Ada detected by the touch panel 16) causing the microprocessor 38 to execute a predetermined set of instructions associated with that button. For example, referring to FIG. 2, the screen includes a keypad 52 composed of number keys from 0 to 9. As each number key is pressed, the microprocessor 38 may, for example, receive and store that number and/or transmit it via modem 42 to a central computer.

As is understood in the art, each virtual button 46 may include a "pressed" and "unpressed" image reflecting its two possible states. A shadow box around the button 46 changes with these different modes to suggest the shading that would obtain with a real button being depressed or released.

Other than the differences between the "pressed" and "unpressed" images, the simplest form of virtual buttons 46 are essentially static: staying in the same place and having the same alphanumeric label on a given screen. Generally, however, a given screen may also include nonstatic virtual buttons, for example, a scrolling list of text 48. The virtual buttons, further, need not look like conventional buttons but may include for example, animated graphical elements that may move across the screen. Area 48 may be separated into smaller virtual buttons 46 whose location is fixed but whose contents, i.e., the alphanumeric label and the set of instructions executed by the microprocessor 38 change as the display scrolls. In addition, the screen may include printed plain text instructions 50, which, during non-audio mode (to be described) and unlike the above virtual buttons 46, generally are not pressed to invoke the execution of a set of predetermined instructions by the microprocessor 38. Henceforth the term virtual button will be considered to generally embrace any defined field on the screen which may be activated by a touch to cause the computer to initiate a predefined set of instructions. Thus the text field 50 and the scrolling area 48 are virtual buttons 46.

In a non-audio mode, the microprocessor 38 displays a given screen with its virtual buttons 46 and monitors the X-Y coordinate generated by the touch panel 16 comparing the coordinate against a map of button locations contained in memory 40 and associated with that particular screen. If a touch point occurs within the outline of a particular virtual button, that button is considered to have been pressed and the microprocessor 38 executes the instructions associated with that button.

In the present invention, an audio mode may be activated in which audio queues are provided to assist the vision-impaired user. In the preferred embodiment the audio mode is entered by a standard gesture in which a stylus (e.g., a finger or pen) is pressed against the upper right hand corner of the display area 14 at point 56 and drawn leftward at least half way across the top of the display area 14 as indicated by arrow 58. This gesture is selected to be simple and to start at a readily determinable position on the display area 14 and yet to be unlikely to be accidentally invoked. An opposing gesture, in which the finger is pressed against the upper left hand side of the screen 60 and drawn rightward at least three quarters of the way across the top of the screen as indicated by arrow 62 is used to convert back to a non audio mode. Canceling the audio mode intentionally, thus requires a somewhat greater effort by the user than activating the audio mode so as to prevent accidental cancellation and to allow the user the greatest possible latitude in moving a finger around on the screen.

Figure 8:
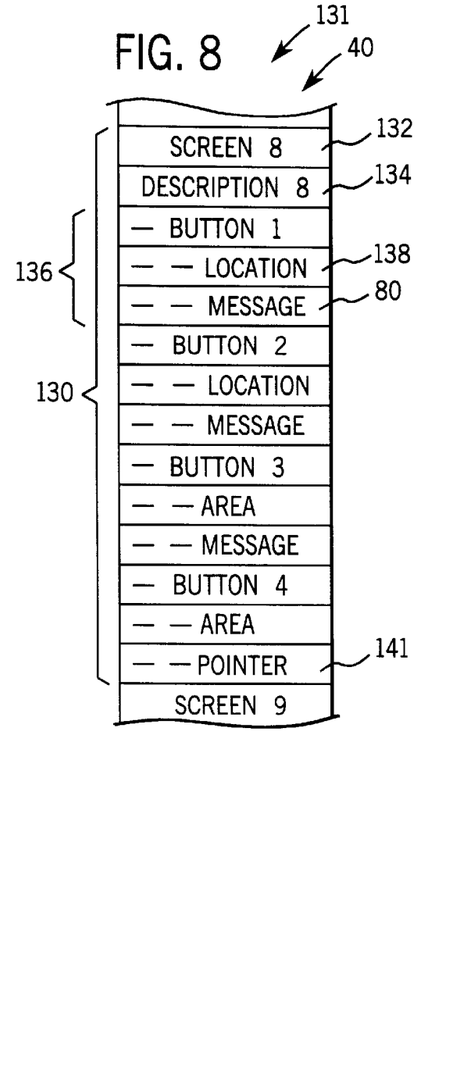
FIG. 8 is a representation of a table contained in memory defining each virtual button displayed on display screen.

When the audio mode has been invoked, generally the touch point will be used to trigger audio cures enabling the vision-impaired individual or the individual who has difficulty reading, improved access to the information and capabilities of the touch 5 screen. In the audio mode of the present invention, the user is provided with audio clues as to the location of the touch point with respect to the defined virtual buttons 46. Referring now to FIG. 8, the microprocessor 38, evaluates the touch point signal from the touch panel 16, against a table 131 stored in memory 40 and indicating the locations (and sizes) of the virtual buttons 46 and providing a spoken message 80 identifying the button's function. The virtual buttons 46 listed in table 131 are arranged by screens, and each screen is associated with a spoken description 134 describing the general layout of the screen. Thus, the table 131 includes a set of entries 130 for each screen display including a text description of the screen 134 such as may be provided to the sound card 34. After the audio mode has been invoked, the description 134 of the screen currently displayed by the microprocessor 38 on the display 12 may be played by touching the screen in the upper left hand corner and releasing the touch screen without sliding the finger rightward or downward as indicated by arrows 62 and 33. The verbal screen description for the screen of FIG. 2, for example, might be:

This screen provides for the withdrawal of money from your account or the determination of an account balance. In the lower right hand corner is a telephone type keypad. Above this keypad is a scrolling menu of different account types including: checking and savings accounts. In the lower left hand corner additional buttons allow the numbers on the key pad to be entered or cleared or invoke a help screen or return you to the main menu. Above these buttons are a text description of this screen.

Referring still to FIG. 8 within the entries 130 for each screen are entries 136 defining the various virtual buttons on the screen by their location of their boundaries 138 and providing a text message 80 usable by the sound card 34 if that virtual button is pressed. The location data includes the necessary information defining an inner and outer boundaries of the button (as will be described). The message data 80 is normally the same as that printed in the image of the virtual button 46 but in the case of text block 50 is a short description of the text, for example, "text field" so that the user is not burdened with listening to the entire text message corresponding to the printed text within the text block 50 text.

Generally in the audio mode, the microprocessor 38 will identify the screen being displayed and based on a comparison of the touch point to the locations 138 for that screen will play the message 80 associated with that button. As mentioned, when the touch point 57 in the upper left hand corner of the display area 14 is pressed the description 134 associated with that screen will be played.

Consider now the virtual buttons 46 providing number keys 1 and 2 for the keypad 52. The touch point may move in a trajectory 66 from a position to the left of number key 1 in an area not occupied by any other virtual button 46 then across the left most boundary of the general number key 1 and across the surface of the number key 1 and out of its right boundary into a space not occupied by any other button 46. Continuing the trajectory 66 may cross the left boundary of the number key 2 and prior to exiting the number key 2, the finger may be lifted as indicated by the trajectory 66 becoming dotted.

Figure 5:
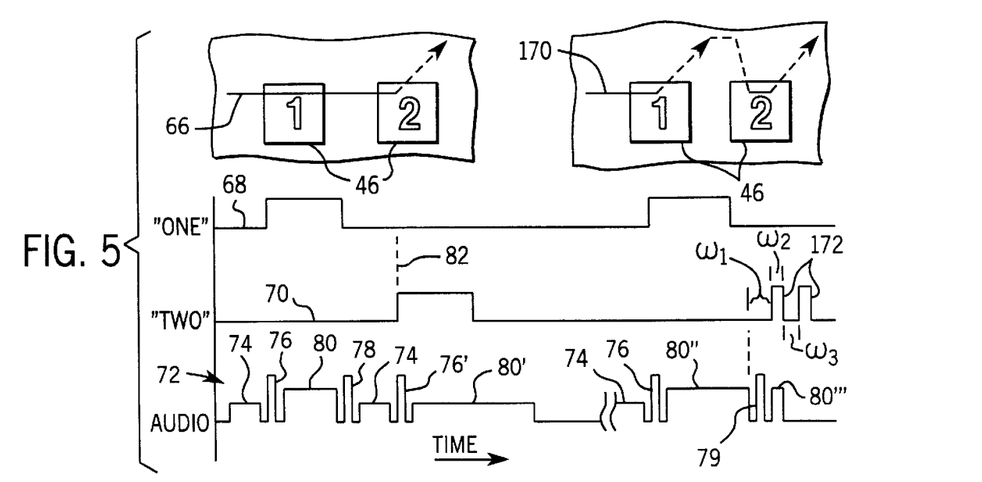
FIG. 5 is a timing diagram showing the generation of audio ridge signals, background sound, and spoken messages as a touch point moves across virtual buttons.

Each point of the trajectory 66 is associated with an audio queue indicated by audio track 72. Generally for points of the trajectory 66 in area 51 outside of any virtual button 46, a background sound 74 is generated. Such a background tone may, for example, be white noise which is perceived as a gentle hissing sound. The purpose of the background sound 74 is to establish that a touch signal on the screen is in fact being generated but not within any virtual button; This is particularly important in some touch screens which require moderate pressure to be activated. The background sound 74 further establishes that the audio mode has been invoked and that the basic hardware is working.

When the trajectory 66 crosses the left most boundary of the number key 1, an audio ridge signal 76 is generated. Any easily recognized tone may be used, however, in the preferred embodiment it is a short duration signal in keeping with its purpose for providing immediate and accurate indication of the crossing of a button boundary.

Conversely when the trajectory passes out of one button, a second audio ridge signal 78 may be generated, preferably having different characteristics than the audio ridge signal 76 so as to allow the user to discern the entry from the exits of a button. For example, audio ridge signal 76 may be a slightly higher pitched tone suggesting a rising or a lifting as might occur if a real button were crossed and audio tone 78 may be a lower pitched tone suggesting a dropping as if the finger or stylus were passing off of an elevated button. The audio ridge tones 76 and 78 may be further varied to indicate the type of virtual button (e.g., to distinguish between keypad buttons and the text field 50).

A spoken message 80, in this case "one", is begun once the trajectory 66 is within the number key 1. Also, in this case, where the trajectory passes out of number key 1 into a background area 51 and then immediately into the number key 2, the message 80 is truncated upon the occurrence of the audio ridge signal 78. Thus if the user is simply "scanning" the surface of the touch screen or is not interested in the remainder of the description of the button 46, the user may simply move the finger further along causing the message of previous virtual buttons 46 to the silenced.

In contrast, if the finger is lifted prior to the crossing out of a button 46, the message continues to play. For example, as a trajectory 66 crosses the left most boundary of the number key 2, the audio ridge signal 76' is invoked and a spoken message 80'. When the finger is lifted, for example, at instant 82, the message 80' continues to play to completion. This prevents the user from being confused as to which virtual button 46 was the last button pressed if the user's finger briefly touches another button as it is removed from the screen. In particular, when a finger is used as the stylus, a second button may be inadvertently pressed as the user's finger rolls upward from the touch screen. It has been determined that if the message is truncated on this second button, the user may be confused as to the identity of the last button pressed. In a system where the last button pressed is confirmed by pressing the confirmation button 20, any confusion in the identity of the last button pressed may cause the wrong program to be initiated.

Figure 3:
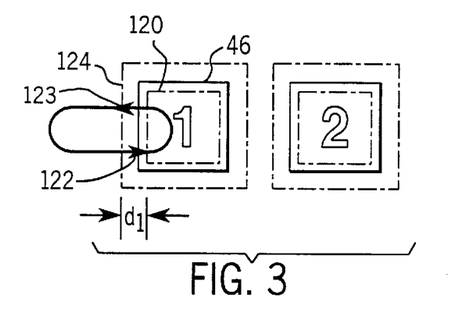
FIG. 3 is an enlarged detail from FIG. 2 showing a touch path across a particular virtual button and the expansion and contraction of the button boundary depending on the direction of the trajectory of the touch point.
Figures 6, 7:
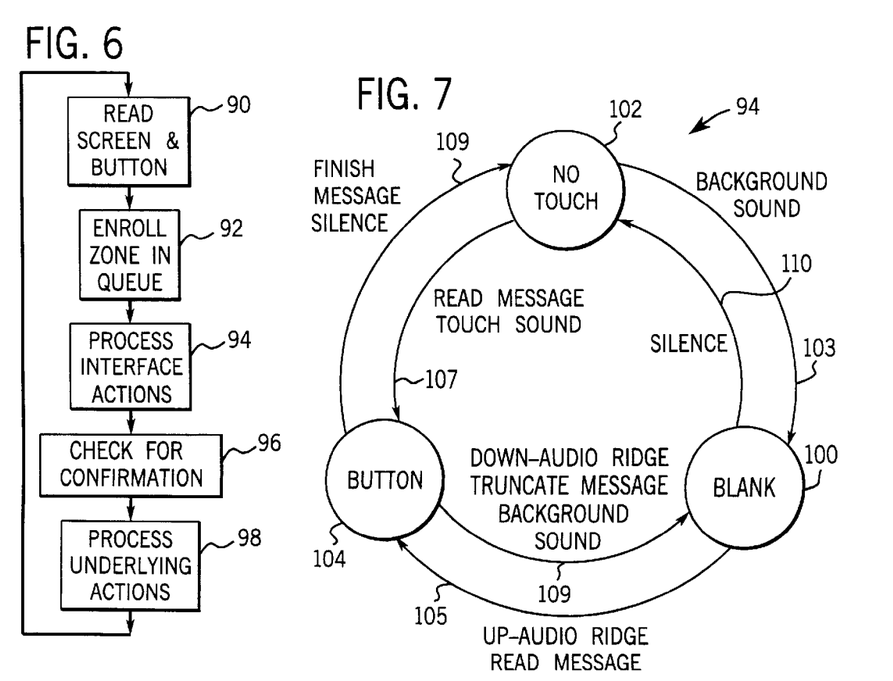
FIG. 6 is a simplified flow chart showing the parsing of touch trajectories into zone changes which affect process actions.
FIG. 7 is a state diagram showing the process actions invoked by various changes in zones of FIG. 6.

Referring now to FIGS. 1, 3 and 6, the steps taken by the microprocessor 38 in evaluating actions on the touch screen system 10 during the audio mode are broken into three phases. In the first phase, indicated by process block 90, coordinates from the touch panel 16 are received and compared to the locations 138 in table 131 to determine the current state of the touch point as either: in a particular button 46 ("BUTTON") in the background area 51 ("BLANK") or off the screen ("NO TOUCH") indicating that the finger is not touching the touch panel 16.

Next, at process block 92, the particular zone of the touch point is enrolled in a queue so that the immediate history of touch points over time may be determined. For example, if the current state of the touch point is NO TOUCH, the previous state may have been either BUTTON or BLANK with different responses by the microprocessor 38 attaching to each.

Next at process block 94, the microprocessor 38 processes particular interface based on a review of the queue 92. These actions include adjustment of the display 12 and the generation of the audio cues as has been described but not the execution of the underlying actions the buttons normally invoke when pressed in both the audio and nonaudio modes.

The text block 50 operate similarly to any other button 46 in their interface actions. When the touch point is within the text zone, a short description of the text message is read. The entire text message is read only when the button selection is confirmed, for example by pressing the confirmation button 20. In the scrolling areas 48 the different zones represent buttons 46 which can announce their contents, however the contents of these buttons 46 generally change as a function of the scrolling. Thus the area in the table 131 normally reserved for the message instead includes a pointer, as is understood in the art, to a separate table (not shown) of scrolled items.

Generally, in the audio mode, the pressing of a button does not immediately invoke the underlying action that pressing the button invoked in the non-audio mode invokes. Instead, that process is broken into two portions, the portion which affects only the display area 14 and the audio cues is separated from the underlying action of the button, for example, the entering of data designated by that button. This two step process is mediated by the confirmation button 20 which must be pressed to confirm a particular action. Thus, the user's finger or stylus is free to wander about the display area 14 to identify the location and functions of the various buttons without fear of activating those buttons. When the confirmation button is pressed, the message 80 of the selection is repeated as a further confirmation.

At process block 96 the activation of the confirmation button 20 is checked. In a preferred embodiment of the invention, activation of the buttons is accomplished by entering within the boundary of a particular button, as has been described, and pressing the confirmation button 20 prior to leaving that boundary. Generally, the user may first touch a particular button 46 and then lift his or her stylus or finger to press confirmation button 20, or in two-handed operation the user may hold his or her stylus or finger within the button 46 pressing confirmation button 20 with the second hand.

At process block 98, if the confirmation button 20 has been pressed, the microprocessor 38 processes the underlying action to that button as if the button had been pressed in the non-audio mode. For text block 50, when the confirmation button is pressed, the full text message of the text block is read.

Referring now to FIGS. 5 and 7, process block 94 determines the necessary audio actions according to the transition between three states of: NO TOUCH, BLANK, and BUTTON as has been described and as may be determined by the queue established in process block 92 and stored in memory 40. Thus, if the touch point is currently at the BLANK state 100, as determined by process block 90, but was previously in the NO TOUCH state 102, as determined from the queue of process block 92 (a transition indicated by arrow 110), then a background sound 74 is generated to indicate that the touch point is in the background area 51. Similarly per arrow 109, if the touch point is currently in the BLANK state but was previously in the BUTTON state 104, background sound 74 is generated but also a down direction audio ridge signal 78 is produced and any message in process is truncated.

If the current state as determined at process block 90 is the BUTTON state 104 indicating that a touch point is within the boundary of a button 46 and if previously the touch point was in the BLANK state 100 (per arrow 105) then an up audio ridge signal 76 is generated and message 80 corresponding to the label of the button 46 is read. In contrast if the BUTTON state 104 is arrived at from the NO TOUCH state 102 (as indicated by arrow 107) the message 80 is read and a touch sound 79 is provided (indicating that the touch panel 16 has registered the touch and shown in FIG. 5), however, no up audio ridge 76 is generated.

Finally if the NO TOUCH state 102 is the current state but the previous state was the BUTTON state 104 (per arrow 109) any message 80 is finished and no sound is generated by the sound card 34. If however the NO TOUCH state 102 is reached by a previous BLANK state 100, then only no sound is generated as indicated by arrow 110.

Referring now to FIGS. 2 and 3, as has been described, the ability to accurately delineate the edges of the virtual buttons 46 so as to permit the user to obtain a sense of their spatial layout is provided by the audio ridge signal 76, 78 at the boundary of the button 46 separate from the message 80 provided by the button. Although it is desirable that the audio ridge 76 or 78 for the edge of the button be sensitive to small changes in the position of touch point so that there is sense of a sharp line where the button begins, nevertheless it is also important to prevent confusing multiple triggerings or chatter of the audio ridges 76 and 78 or message 80 at the boundary of the button. Such multiple triggerings may be caused by a touch point that straddles the boundary of the button and hence moves in and out of the boundary to create rapid minor crossing of the boundary. These multiple triggerings (which can also initiate the spoken message 80) clutter the audio channel that is relied on to inform the vision-impaired user.

Accordingly, in the present invention, two boundaries are used to define each button 46. The first inner boundary 120, generally but not necessarily coextensive with the visual boundary of the button 46, may only be triggered by a passage from outside the boundary 120 to inside the boundary 120 as indicated by arrow 122. Crossing boundary 122 invokes the up audio ridge signal 76 referred to in discussion of FIG. 5.

Once boundary 120 has been crossed, the touch point is considered to be within the button 46 and additional crossings of boundary 120 are of no effect until a second larger boundary 124 outside of boundary 126 is crossed going from the inside of boundary 124 to the outside of boundary 124 as indicated by arrow 123. The distance $d_1$ 10 between boundaries 120 and 124 is selected to be sufficiently large that minor jitter in the movement of the touch point will not cause repeated triggerings of the buttons 46.

When boundary 124 has been crossed from within the boundary to outside of the boundary, an audio down signal 78 is generated and boundary 124 may no longer be triggered by crossing until boundary 120 is again crossed from outside of boundary 120 to inside of boundary 120. Thus, in effect, the boundary of the button moves between boundary 120 and 124 expanding from boundary 120 to 124 when the button is first entered and collapsing to boundary 120 when the button is first exited.

Figure 4:
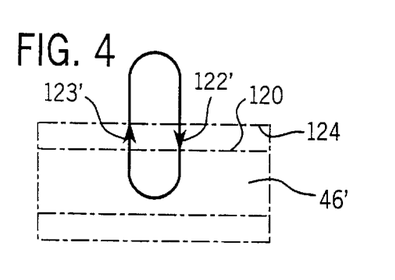
FIG. 4 is a figure similar to that of FIG. 3 showing two button boundaries different only in vertical dimension for a nondisplayed speed list button.
Figure 9:
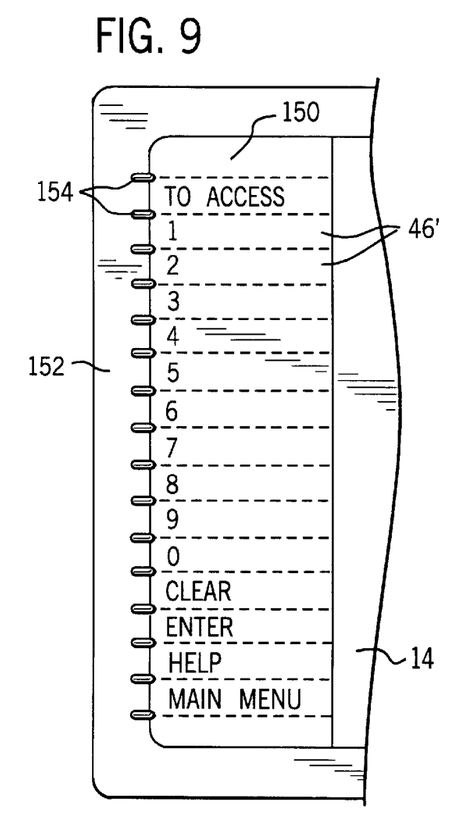
FIG. 9 is a detailed enlargement of the screen of FIG. 2 showing a speed list made visible together with embossments providing ready access to the list members.

Referring now to FIGS. 2, 4 and 9, although the two dimensional layout of some virtual buttons 46, such as the keypad 52, will be convenient to many users with impaired vision, often the three dimensional layout of the virtual buttons 46 will prove unnecessarily cumbersome to the vision-impaired. In these cases, the vision-impaired user will prefer simpler arrangement of the buttons yet as still grouped by different screens. The present invention therefore also provides a speed list that may be invoked by the user touching the upper left hand corner of the screen at point 57 (FIG. 2) and drawing his or her finger downward as indicated by arrow 33. As shown in FIG. 9, the speed list, when displayed, provides duplicates of each virtual button 46, with the duplicate buttons 46' arranged vertically along an edge of a frame 152 surrounding the display area 14. The speed list 150 thus contains a complete set of possible virtual buttons 46 found on the particular screen but arranged to be accessed by moving a finger or stylus upward or downward along a single vertical axes of the left side of the frame 152, the frame 152 which forms a natural channel to guide the finger or stylus.

As each virtual button 46' is invoked, the message 80 associated with the button 46 is played according to the rules previously described. That is, each virtual button 46' has an inner boundary 120' and an outer boundary 124' (which differ only in their vertical dimension) and audio ridge signals 76 and 78 are generated when inner boundary 120' is crossed vertically going into the boundary 120' as indicated by arrow 122' or when outer boundary 124' is crossed vertically going out of the boundary as indicated by arrow 123'. Small embossments 154 in the left side of the frame 152 adjacent to the display area 14 may be used to locate the virtual buttons 46' to allow rapid scanning upward and downward within the buttons without waiting for the audio queues of the audio ridges 76, 78 or the associated messages 80. In all other respects the virtual buttons 46' duplicate the virtual buttons 46 used when the touch screen system 10 is in the non-audio mode.

As shown in FIG. 2 generally the speed list 150 need not be displayed but consists merely of a plurality of touch points 156 in a linear arrangement.

The speed list 150 is updated according to the screen display simply by scanning the table 131 to identify the new buttons and messages available on a given screen. When the speed list 150 is invoked, a separate tone in messages 80 may flag those virtual buttons 46 which may change, for example, by scrolling without a screen change. Whenever the speed list appears or disappears its appearance or departure is announced in keeping with a requirement that all changes in existing displays are announced.

Referring again to FIG. 5, in an alternative embodiment in which confirmation button 20 is not used, confirmation of a given virtual button selection may be made by a sharp double tap 172 on the touch panel 16 timed to occur within certain time windows after the touch panel 16 is no longer touched. For example, with a touch trajectory 170 which passes from the background 51 to the surface of the number key 1 and then lifts off the screen to tap twice on the screen (e.g., on the center of the number key 2), a confirmation of the number key 1 may occur. In this case, the audio track changes from the background sound 74 and then provides an up audio ridge 76 and a message 80". Because the touch point is removed from the screen, the message 80" plays to completion. A short double tap 172 on button 2 and then a release is interpreted as a confirmation. The double tap could occur on any surface of the touch panel 16 but must occur within a predetermined time interval $w_2$ after completion of the message 80, the taps must be no longer than a predetermined $w_2$ and must not be separate by more than $w_3$.

This approach eliminates the need for a separate confirmation button 20 but can require a degree of timing that may make it unsuitable for certain situations or users.

It will be recognized that other methods of confirming a selected virtual key 46 may be used including the use of a landmark position on the touch panel 16 to provide a virtual confirmation button, for example, in the lower left hand corner of the display area 14 or the use of pressure sensitive touch panel 16 where a greater pressure may be interpreted to be a confirmation of a particular selection.

Referring again to FIG. 2, as has been described, when the text block 50 is pressed it will begin a recitation of the text within that block if the text is short. If the text printed in the block is long the field name is announced (indicating generally the type of field) and the confirmation button 20 must be pressed (or other confirmation signal provided) for the entire text to be spoken. For long messages it may also be desirable to allow the user to pause, fast forward or rewind the message. These features may be invoked by additional virtual buttons 46" placed along the right most edge of the display area 14.

In a preferred embodiment, the user moves toward the right side of the screen to locate a reference notch 200 and then touches the screen to invoke a vertical array of buttons 46" like that of the speed list 150. Moving down from the initial point of contact provides audio descriptions of the buttons 46" which allow for the selection of a direction of movement within the spoken message (e.g., forward or backward) and for the increment of movement (e.g., paragraph, sentence, word, and letter). The confirmation button is used to select the direction and increment last touched. With each tap of the screen the message is incremented as selected. If the letter increment is chosen the message is spelled, a capability provided by storing the spoken message and its spelling or by using a text driven speech synthesizer. This same procedure may be used to navigate around in a table contained on the screen. In this case the buttons 46" provide for movement up down left and right.

The above description has been that of a preferred embodiment of the present invention. It will occur to those that practice the art that many modifications may be made without departing from the spirit and scope of the invention. Clearly, the present invention is not limited to use with full sized computer terminals but may be used on any touch screen providing the necessary spatial resolution, for example, those used on cellular telephones, personal digital assistants (PDA's) or various pieces of standard office equipment such as copy or fax machines. The audio circuitry may share components with the computer and may rely on the computer for certain synthesis tasks. In order to apprise the public of the various embodiments that may fall within the scope of the invention, the following claims are made.

I claim:

1. A touch screen for the vision-impaired comprising:
   (1) an electronic display screen having a display area;
   (2) a touch panel commensurate with the display area and providing a coordinate output indicating a touch point in the display area;
   (3) an electronic computer communicating with the electronic display screen, the touch panel and executing a stored program to:
      (a) display a plurality of first virtual buttons on the display screen having arbitrary locations within the display area;
      (b) respond to a touching of one of the plurality of first virtual buttons to execute a subroutine associated with the touched virtual button;
      (c) generating a plurality of second virtual buttons having a one-to-one correspondence with the first plurality of virtual buttons but arranged on the display screen in a linear array; and
      (d) respond to a touching of a given one of the plurality of second virtual buttons to execute a subroutine associated with a first virtual button corresponding to the given second virtual button.

2. The touch screen of claim 1 wherein the electronic screen includes a frame extending around the display surface and providing a ridge along which a stylus may be drawn and wherein the plurality of second virtual buttons are arranged on the display screen adjacent and parallel to the ridge.

3. The touch screen of claim 1 wherein the ridge includes a plurality of embossments and wherein the plurality of second virtual buttons are arranged on the display screen to correspond with the plurality of embossments.

4. The touch screen of claim 1 further including:
   (4) audio circuitry communicating with the electronic computer; and wherein the electronic computer further executes the stored program to:
      (e) when the touch point crosses into a virtual button, instruct the audio circuitry to generate a spoken message identifying the virtual button;
      (f) when the touch point crosses out of a virtual button after the touch point crosses into the virtual button, truncate the spoken message; and
      (g) while there is no touch point immediately after the touch point crosses into the virtual button, completes the spoken message.

5. The touch screen of claim 1 further including:
(4) audio circuitry communicating with the electronic computer; and wherein the electronic computer further executes the stored program to:
   (a) identify a first inner boundary and a second outer boundary of a virtual button with respect to the screen;
   (b) instruct the audio circuitry to generate a spoken message identifying the virtual button only after the touch point has crossed the inner boundary into the virtual button; and
   (c) after the spoken message is begun, instruct the audio circuitry to complete the spoken message unless the touch point crosses the outer boundary out of the virtual button.

6. The touch screen of claim 1 further including:
(4) audio circuitry communicating with the electronic computer; and wherein the electronic computer further executes the stored program to:
   (a) identify a boundary of a virtual button with respect to the display screen;
   (b) when a touch point crosses the boundary of the virtual button, instruct the audio circuitry to generate an audio ridge signal delineating the boundary; and
   (c) while the touch point is within the boundary of the virtual button, instruct the audio circuitry to generate a spoken message identifying the virtual button.

7. The touch screen of claim 6 wherein the electronic computer further instructs the audio circuitry to generate a first audio ridge signal when the touch point crosses into the boundary of the virtual button and a second audio ridge signal when the touch point crosses out of the boundary.

8. The touch screen of claim 6 wherein the electronic computer further instructs the audio circuitry to generate a background sound while the touch point is outside the boundary.

9. The touch screen of claim 6 wherein the electronic computer identifies a first inner boundary and a second outer boundary of the virtual button and wherein the audio circuitry is instructed to generate the audio ridge signal only when the touch point is crossing into the inner boundary and when the touch point is crossing out of the outer boundary.

10. The touch screen of claim 6 wherein the electronic computer instructs the audio circuitry to truncate the spoken message only when the touch point is crossing out of the boundary.

11. The touch screen of claim 6 wherein the electronic computer identifies a first inner boundary and a second outer boundary of the virtual button and wherein the audio circuitry is instructed to generate the spoken message only after the touch point has crossed into the inner boundary and to truncate the spoken message only when the touch point is crossing out of the outer boundary.

* * * * *

UNITED STATES PATENT AND TRADEMARK OFFICE
CERTIFICATE OF CORRECTION

PATENT NO. : 6,384,743 B1
DATED : May 7, 2002
INVENTOR(S) : Gregg C. Vanderheiden It is certified that error appears in the above-identified patent and that said Letters Patent is hereby corrected as shown below:

Column 1,
Line 3, after the title of the invention and before the first paragraph, insert -- STATEMENT REGARDING FEDERALLY SPONSORED RESEARCH OR DEVELOPMENT --

Column 5,
Line 34, "is Ada detected" should be -- is detected --.

Column 6,
Line 59, "comer" should be -- corner --.

Column 8,
Line 45, "nonaudio" should be -- non-audio --.

Column 10,
Line 20, "$d_1$ 10 between" should be -- $d_1$ between --.
Line 43, "comer" should be -- corner --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,384,743 B1
DATED        : May 7, 2002
INVENTOR(S)  : Gregg C. Vanderheiden It is certified that error appears in the above-identified patent and that said Letters Patent is hereby corrected as shown below:

Column 1,
Line 3, after the title of the invention and before the first paragraph, insert
-- STATEMENT REGARDING FEDERALLY SPONSORED RESEARCH OR DEVELOPMENT --

Column 5,
Line 34, "is Ada detected" should be -- is detected --.

Column 6,
Line 59, "comer" should be -- corner --.

Column 8,
Line 45, "nonaudio" should be -- non-audio --.

Column 10,
Line 20, "$d_1$ 10 between" should be -- $d_1$ between --.
Line 43, "comer" should be -- corner --.

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,384,743 B1
DATED : May 7, 2002
INVENTOR(S) : Gregg C. Vanderheiden It is certified that error appears in the above-identified patent and that said Letters Patent is hereby corrected as shown below:

<u>Column 1,</u>
Line 8, insert:
-- CROSS-REFERENCE TO RELATED APPLICATION
This application is a continuation of U.S. Application Serial No. 08/546,012 filed October 20, 1995 -- should be inserted.

Signed and Sealed this

Thirteenth Day of September, 2005

JON W. DUDAS
*Director of the United States Patent and Trademark Office*